Patented May 14, 1940

2,200,307

UNITED STATES PATENT OFFICE 2,200,307

MALE SEX HORMONE COMPOUND

Walter Schoeller, Berlin-Westend, Max Gehrke, Birkenwerder, near Berlin, and Friedrich Hildebrandt, Hohen Neuendorf, near Berlin, Germany, assignors to Schering Corporation, Bloomfield, N. J., a corporation of New Jersey No Drawing. Application January 12, 1935, Serial No. 1,498. In Germany January 16, 1934

2 Claims. (Cl. 260—397)

This invention relates to the male sex hormone and more especially to a method of producing crystallized derivatives of said hormone from its starting materials from which the hormone may be isolated in a purer form than was hitherto possible.

In the copending application of Adolf Butenandt, Serial No. 638,389, a method is described and claimed whereby a crystallized male germinal gland hormone is produced by reacting crude oily starting materials containing said hormone with a substance capable of forming condensation products with the keto group, recrystallizing the condensation product obtained, decomposing same to split off the hormone and further purifying same by fractionated sublimation in vacuo, fractional crystallization or fractional distillation in a high vacuum. Suitable substances capable of reacting with the keto group are hydroxylamine, hydrazine and its derivatives.

Now it has been found that this method can be applied for producing crystallized keto derivatives of the male sex hormones or said hormones themselves from any kind of starting material, even from highly impure preparations of animal or vegetable or synthetic origin.

Especially suitable proved to be the condensation by means of semicarbazide or thio-semicarbazide which form crystallized, rather insoluble semicarbazones or thio-semicarbazones. But other typical reagents for the keto group may also be used.

As typical reagents for the keto group there are to be understood in accordance with the principles set forth herein and in the claims annexed hereto those compounds which are used for identifying ketones, i. e., compounds which form relatively stable and insoluble and well-crystallized reaction products with said ketones by condensing with the carbonyl group, whereby usually water is split off. Such reagents include compounds having a free amino group as, for instance, phenylhydrazine and its substitution products, such as p-nitro phenyl-hydrazine, p-bromo phenyl-hydrazine, diphenyl-hydrazine and the like, which form the corresponding hydrazones, semicarbazide and thio-semicarbazide, which yield the corresponding semicarbazones and thio-semicarbazones, the latter being capable for forming insoluble salts with heavy metal compounds, such as silver nitrate, copper acetate, mercuric acetate and the like, amino guanidine, the condensation product of which forms well-crystallized picrates, benzyhydrazide and nitrobenzhydrazides, which yield well-crystallized, rather difficultly soluble condensation products with ketonic compounds, hydroxylamine forming the so-called oximes with ketones, and others. The reaction of ketones with these reagents is a procedure which is in principle well known to every organic chemist so that it does not need further explanations. However, in order to illustrate this invention more in detail, the following examples are given:

Example 1

10 grams of semicarbazide hydrochloride are mixed with 10 grams of crystallized sodium acetate and the mixture is heated. The molten mixture is boiled consecutively with 60, 40 and 40 cc. of ethyl alcohol. The alcoholic solutions are mixed, filtered and added to the solution of 20 grams of an oily hormone preparation in 100 cc. of absolute alcohol. The mixture is then boiled for 10 hours under the reflux condenser. During boiling and on cooling and subsequent concentration to about one half of the volume a yellow crystalline powder separates out, which is filtered by suction, purified by consecutive washing with alcohol, ether, alcohol, hot water and alcohol and dried in the desiccator. The yield is about 1.5 grams. This product may be recrystallized from propyl alcohol; however, such recrystallization is not necessary for the splitting off of the hormone, the dry purified product being finely pulverized and heated for 30 to 40 minutes on the water bath for dissolution with 70 cc. of a mixture obtained by mixing 150 cc. of a 96% alcohol, 30 cc. of water and 20 cc. of concentrated sulfuric acid. After cooling the reaction mixture is mixed with water and extracted with ether. The ethereal extract is washed with water, dried and evaporated in vacuo. There remains a brownish yellow oil, which crystallizes after some time in the desiccator. The yield is about 600 to 800 milligrams. This crystallized product is repeatedly recrystallized from hot alcohol. The pure crystals melt at 178° C. Instead of repeatedly recrystallizing the crystalline product, one may also heat the same under a high vacuum of $1 \times 10^{-3}$ millimetres, when oily constituents will pass over at 85 to 90° C., the hormone itself being sublimated at 90 to 120° C. This sublimate on being recrystallized once, melts at 178° C.

While 1 gram of the non-crystalline starting material contains 250 capon units, 1 gram of the crystallized hormone melting at 178° C. contains 6665 capon units.

Example 2

10 grams of a crude hormone oil showing an activity of 15 mg. for the capon unit, are dissolved in 70 cc. of ethanol to which solution there are added 4.5 grams of finely pulverized thio-semicarbazide and 3.2 grams of glacial acetic acid. The reaction mixture is then boiled for 4 to 5 hours under reflux. Already during the boiling crystals of the thio-semicarbazone of the male sex hormone separate out. On cooling, the precipitate is filtered off by suction, is washed successively with hot water, ethyl alcohol, and ether, and finally is recrystallized from propyl alcohol. The thio-semicarbazone of the male sex hormone obtained forms white crystals having a melting point of about 279° C. Its analysis yields values corresponding to a compound of the formula $C_{20}H_{34}N_3SO$.

This compound may be used as such or preferably be split up to the male sex hormone by treatment with acids. The crystals of the hormone obtained on cleavage have a melting point of about 178° C. (uncorrected).

Example 3

8 grams of a crude hormone oil of an activity of 18 mg. for the capon unit are dissolved in 40 cc. of ethyl-alcohol. To this solution there is added an alcoholic solution of 3 grams of semicarbazide and 2.6 grams of glacial acetic acid whereupon the mixture is heated under reflux for several hours. On cooling, the semicarbazone of the male sex hormone crystallizes out. It is filtered off by suction and washed with water, ethyl alcohol and ether. On recrystallization it is obtained in the form of white crystals of the melting point 274–276° C.

In order to split off the male sex hormone from said semicarbazone, 1 gram of the crude product is dissolved, while heating, in 35 cc. of dilute alcoholic sulfuric acid (10 cc. of concentrated sulfuric acid, 15 cc. of water and 75 cc. of ethyl alcohol) or in 35 cc. of alcoholic-aqueous hydrochloric acid (50 cc. of concentrated hydrochloric acid, 50 cc. of ethyl alohol). The solution is boiled for 15–20 minutes on the boiling water bath, thereupon diluted with water and extracted with ether. The ethereal solution is washed with sodium bicarbonate solution and water, dried and evaporated. The crude cleavage product is triturated with a little freshly distilled ethyl alcohol and crystallized by cooling. The hormone obtained thereby may be further purified by sublimation in a high vacuum. It has a melting point of about 178° C. (uncorrected).

Example 4

6.5 grams of the neutral portion obtained, for instance by oxidation of dibromo cholesterine acetate by means of chromic acid, splitting off the bromine by treatment with zinc dust and glacial acetic acid, and removing the unreacted holesterin acetate, are dissolved in 20 cc. of ethyl-alcohol. To this solution 6 grams of semicarbazide acetate are added whereupon the reaction mixture is slightly heated. A semicarbazone is produced in a quantity of about 1 gram which can be recrystallized from chloroform-methyl alcohol. Its melting point is about 267° C. with decomposition, representing the semicarbazone of dehydroandrosterone acetate.

The semicarbazone is split up with aqueous oxalic acid or mineral acids and the cleavage product is saponified with alcoholic alkali hydroxide solution. In this manner the pure unsaturated hydroxyketone of the formula $C_{19}H_{28}O_2$, the dehydroandrosterone, is obtained which may be recrystallized from dilute acetone yielding white needles of the melting point 148° C. (uncorrected).

Example 5

1 gram of an alcoholic extract of testes with an activity of 1 mg. for the capon unit is heated with an alcoholic solution of hydroxyl-amine prepared from 0.5 gram of hydroxylamine hydrochloride and 0.5 gram of anhydrous sodium acetate, for 5 hours on the water bath. The reaction solution may be worked up in the following manner:

Either it is filtered, somewhat concentrated by evaporation and carefully diluted drop by drop with water, while heating, until it becomes cloudy. Thereupon, on cooling the oxime separates out as an oil which is transformed into the crystalline state by rubbing with a glass rod or by inoculation with crystals of the oxime.

Or the working up of the reaction solution is carried out in a simpler manner by evaporating the same in a vacuum to dryness, triturating the residue with a little ether, filtering the ethereal solution and allowing the same to stand. The oxime separates out in the form of well-crystallized needles. Further amounts may be obtained from the mother liquor by evaporating the solvent, dissolving the residue in about 2 cc. of absolute alcohol and adding ½ cc. of concentrated hydrochloric acid to the solution. Thereupon on standing for several hours a further amount of crystals of the oxime are obtained. The combined crystals are recrystallized from dilute alcohol, yielding fine prismatic needles of the melting point 215–221° C.

In a similar manner the phenyl hydrazone of the melting point 153–154° C., the thiosemicarbazone of the melting point 250–255° C. and other functional derivatives of the keto group of the male sex hormone may be obtained.

The splitting off of the hormone from said oxime, phenylhydrazone, thio-semicarbazone and the like is carried out in the customary manner, for instance, as described in the preceding examples.

Thus, 180 mg. of the oxime are heated to the boiling point in amounts of 20 mg. each with 20 cc. of ethyl alcohol and 5 cc. of concentrated hydrochloric acid. Thereupon the combined reaction solutions are highly concentrated by evaporation in a vacuum. The cleavage product is precipitated by the addition of much water and the precipitate is filtered off. It is either slowly sublimated in a high vacuum of about 0.0001 mm. at a temperature of 65–85° C. or it is recrystallized from dilute alcohol or dilute acetone yielding 47 mg. of the pure hormone. Further amounts of the hormone are obtained from the collected mother liquors. The pure androsterone crystallizes in small feather-like plates or in long prismatic needles of the melting point 178° C. (uncorrected). It is readily soluble in all organic solvents, but only very difficultly in water. Its optical rotation value is $\alpha = +93°$. Its physiological activity amounts to 150–200 γ for the capon unit.

Example 6

A reaction solution which contains, besides other products, androsterone acetate, is heated to boiling for 2½ hours on the water bath with an alcoholic solution of hydroxylamine acetate in a similar manner as described in Example 5.

The oxime is precipitated in crystalline form from the concentrated solution by careful addition of water. It is recrystallized from dilute alcohol and forms well-proportioned needles.

The splitting off of the androsterone acetate therefrom may be carried out in the same manner as described in Example 4.

Example 7

In a similar manner as described in Example 4 there is obtained the semicarbazone of androsterone acetate by heating an alcoholic solution containing this hormone acetate besides other compounds, with an excess of semicarbazide acetate. The melting point of the isolated crystalline semicarbazone of androsterone acetate is about 269–272° C. (uncorrected).

Of course, instead of using crude preparations containing the male sex hormones, androsterone and dehydroandrosterone, or their substitution products of the hydroxy group in ring 1, for instance the acylated androsterones, such as androsterone acetate, dehydroandrosteroneacetate and the like, also preparations containing other compounds of similar constitution, such as the keto cyclopentano dimethyl tetradecahydro phenanthrols which may be obtained from pregnanolones by reacting with Grignard reagents, splitting off water and oxidation, and which represent isomers of the androsterone and also show a physiological activity similar to that of androsterone, or the keto cyclopentano dimethyl dodecahydro phenanthrols, which may be produced in a similar manner from pregnenolone and which represent isomers of the dehydroandrosterone, and the acyl derivatives of these compounds may be employed as starting materials.

Example 8

A crude keto cyclopentano dimethyl tetradecahydro phenanthrol is purified in the following manner:

To an alcoholic solution of said compound obtained in a suitable manner from pregnanolone and containing other compounds besides, there is added 1 mol. of semicarbazide and the reaction mixture is heated to boiling for 5 hours. After cooling the precipitated semicarbazone is filtered off by suction, washed with hot water and with alcohol and decomposed by heating with aqueous oxalic acid. Thereby a physiologically highly effective product is obtained in a high yield.

Of course, one may proceed in such a manner that the crude acetate of said keto phenanthrol as it may obtained from pregnanolone or other compounds, is first precipitated from the reaction mixture by means of semicarbazide and glacial acetic acid, which semicarbazone may then be decomposed to the pure crystalline acetate of the keto phenanthrol.

Example 9

The glacial acetic acid solution, as it is obtained by reacting pregnanolone with Grignard reagent, dehydrating and ozonizing the reaction product, is diluted with water and extracted with ether. 2 grams of the yellowish resinous residue obtained on evaporation of the etheral solution are dissolved in 30 cc. of alcohol, a solution of 1.5 grams of pulverized thio-semicarbazide in 2 cc. of glacial acetic acid is added thereto and the reaction mixture heated to boiling for 4 hours. After cooling, the precipitate separated out is filtered off by suction, boiled with water and recrystallized from isopropyl alcohol. On decomposition with dilute mineral acids the pure keto cyclopentano dimethyl tetradecahydro phenanthrol is obtained.

Example 10

0.5 gram of a crude acetate of the keto cyclopentano dimethyl dodecahydro phenanthrol, obtained by successively reacting pregnenolone with Grignard reagent, dehydrating and oxidizing while protecting the double bond in ring 2 and the hydroxy group in ring 1 by intermediary blocking of the same, for instance, by bromination and acylation, are boiled for several hours in 50 cc. of absolute methyl alcohol with 0.3 gram of hydroxylamine chlorohydrate and 0.35 gram of anhydrous sodium acetate. On dilution with water the oxime of the keto cyclopentano dimethyl dodecahydro phenanthrol acetate is obtained which on decomposition and saponification yields a highly effective keto cyclopentano dimethyl dodecahydro phenanthrol.

By "ketone-reagent," as employed in the claims, is to be understood a compound which is capable of reacting with the carbonyl group of a ketone to form condensation products therewith, such reagents including hydrazine, phenylhydrazine and its substitution products, such as p-nitro phenylhydrazine, p-bromo phenylhydrazine, diphenylhydrazine, and the like, semicarbazide and thio-semicarbazide, amino guanidine, benzhydrazide, nitro-benzhydrazides, and hydroxylamine. These ketone-reagents are disclosed in Houben, "Methoden der organ. Chemie," 3rd edition, volume II, pages 572–577.

Of course, these examples merely serve to illustrate the invention without, however, limiting the same to them; for, many variations and changes in the reaction conditions may be made by those skilled in the art in accordance with the principles set forth herein and in the claims annexed hereto.

What we claim, is:

1. Crystalline compounds of the general formula $C_{19}H_{27}(OH)X$ and the structural formula

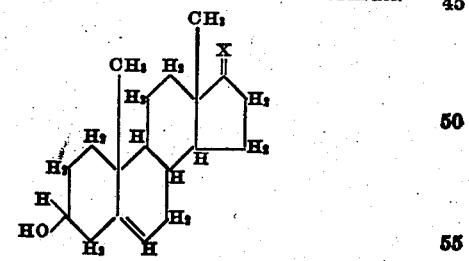

wherein X represents a member of the group consisting of the radicals =NOH,
=N·NH·OC·C$_6$H$_5$, =N·NH·C$_6$H$_5$,
=N·NH·C(=NH)·NH$_2$
=N·NH·CS·NH$_2$ and =N·NH·CO·NH$_2$, said compounds being relatively free from nuclearly saturated compounds and exerting a physiological effect similar to that of the male sex hormone $C_{19}H_{28}O_2$ and being capable of being split up into compounds of the general formula
$C_{19}H_{27}(OH)O$.

2. The isolated semicarbazone of dehydro androsterone $C_{19}H_{28}O_2$, said dehydro androsterone having a melting point of about 148° C.

WALTER SCHOELLER.
MAX GEHRKE.
FRIEDRICH HILDEBRANDT.